United States Patent
Zehnder et al.

(10) Patent No.: US 10,955,285 B2
(45) Date of Patent: Mar. 23, 2021

(54) WEIGHING BALANCE HAVING A MOUNTING UNIT FOR CARRYING ACCESSORIES

(71) Applicant: Mettler-Toledo GmbH, Greifensee (CH)

(72) Inventors: Marc Zehnder, Uster (CH); Louis Caglioni, Oberwil (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 16/798,694

(22) Filed: Feb. 24, 2020

(65) Prior Publication Data

US 2020/0284645 A1 Sep. 10, 2020

(30) Foreign Application Priority Data

Mar. 7, 2019 (EP) .................................... 19161287

(51) Int. Cl.
*G01G 17/06* (2006.01)
*G01G 21/28* (2006.01)

(52) U.S. Cl.
CPC ........... *G01G 21/286* (2013.01); *G01G 17/06* (2013.01)

(58) Field of Classification Search
CPC ....... G01G 13/24; G01G 17/06; G01G 21/286
USPC ...................................................... 177/145
See application file for complete search history.

(56) References Cited

U.S. PATENT DOCUMENTS

| | | | | |
|---|---|---|---|---|
| 6,566,614 | B1 * | 5/2003 | Fluckiger | G01G 21/286 177/180 |
| 6,603,081 | B2 * | 8/2003 | Luchinger | G01G 21/28 177/126 |
| 6,686,545 | B2 * | 2/2004 | Luchinger | G01G 21/286 177/126 |
| 8,294,046 | B2 | 10/2012 | Lüchinger et al. | |
| 8,299,375 | B2 | 10/2012 | Lüchinger et al. | |
| 9,719,844 | B2 * | 8/2017 | Lewandowski | G01G 21/286 |
| 2019/0316955 | A1 * | 10/2019 | Buchmann | G01G 21/286 |
| 2019/0316956 | A1 * | 10/2019 | Buchmann | G01G 21/286 |
| 2019/0376836 | A1 * | 12/2019 | Zehnder | G01G 21/22 |

FOREIGN PATENT DOCUMENTS

CN 207180858 U 4/2018

* cited by examiner

*Primary Examiner* — Jacques M Saint Surin
(74) *Attorney, Agent, or Firm* — Standley Law Group LLP; Jeffrey S. Standley; Stephen L. Grant

(57) ABSTRACT

A balance (10) has a mounting unit (30) movably connected to a first side (35) of a rear wall (25) of a weighing chamber. The mounting unit is above a top wall (23) of the weighing chamber. An elongate slot (40) extends from the first side through a second side (36) and receives the mounting unit and the top wall. The elongate slot guides the mounting unit and the top wall in a direction normal to a base body (11) of the balance. A position control unit (50), on the second side, has lower and upper carriages (52, 54). The upper carriage is connected to the mounting unit and the lower carriage is connected to the top wall. A stopper (64) limits the lower carriage at a predetermined position away from the base body, while allowing the upper carriage to advance therebeyond, separating the mounting unit from the top wall.

15 Claims, 8 Drawing Sheets

WEIGHING BALANCE HAVING A MOUNTING UNIT FOR CARRYING ACCESSORIES

CROSS-REFERENCE TO RELATED APPLICATIONS

This application claims the benefit of priority to European patent application 19161287.8, filed on 7 Mar. 2019, which is incorporated by reference as if fully recited herein.

TECHNICAL FIELD

The invention concerns a weighing balance having a mounting unit and a top wall, which are arranged to be moved along the weighing chamber rear wall by means of a position control unit. The position control unit is arranged to control the movement of the mounting unit and the top wall and hold them at distinct positions.

BACKGROUND ART

Weighing balances of the type to which this invention belongs are used to weigh small objects or substances with a very high precision of, typically, a fraction of a milligram. The sensitivity that enables a balance to measure weight so precisely also makes the balance susceptible to any air circulation in the area of the weighing pan. The weighing pan and the space above it are therefore separated from the ambient environment by an enclosure, which is commonly referred to as a draft shield. The space inside the draft shield is referred to as the weighing chamber. While a draft shield keeps out drafts of ambient room air, the weighing accuracy and speed of operation of a laboratory balance may still be negatively affected by temporary turbulence when a door of the draft shield is opened, and in addition by convective air currents inside the weighing chamber due to heat dissipation from the electrical and electronic parts of the balance. These air movements inside the draft shield tend to be stronger and takes longer duration to subside when the volume of the weighing chamber is larger. It is well known in the art that smaller weighing chamber volumes will have lesser turbulence and offer better accuracy. In conventional practice, draft shields of varying sizes are maintained as part of the ware to meet these demands.

One known state-of-the-art draft shield for a laboratory weighing balance, described in commonly-owned U.S. Pat. No. 8,294,046, has planar panels, i.e. a rear wall, a front wall, two sidewalls, a top cover, and a floor, which together enclose a weighing chamber. The front wall and sidewalls are suspended from the edges of the top cover and overhang the front and sides of a base housing of the weighing balance. The top cover with the suspended front- and sidewalls can be raised and lowered, with the front- and sidewalls sliding up and down over the front and sides of the base housing, whereby the height of the weighing chamber can be adjusted. Obviously, the range of downward movement ends at the point where the bottom edges of the front- and sidewalls reach the level of the work surface on which the weighing balance is set up. In addition, the dosage dispensing housing carrying the dosage dispensing device is configured to move in a fore and aft direction in a horizontal plane of the weighing balance. The top cover is also attached fixedly to the dosage dispensing housing so that the top cover travels along with the dosage dispensing housing at all times. For removing the dosage-dispensing device, the entire housing is moved backwards. Thus, the possible range of height adjustment of the weighing chamber with the draft protection device is rather limited. Besides, the process of setting up the dosage-dispensing device for performing the dosing operation as described in U.S. Pat. No. 8,294,046 is time consuming.

The object of the present invention is to improve the weighing balance of the type described above by providing one or more features that enable easy mounting and movement of replaceable accessories attached to the mounting unit. The inventive weighing balance according to claim 1 accomplishes the aforementioned task. Advantageous embodiments and detail features of the invention are set forth in the dependent claims accompanying this specification.

SUMMARY OF INVENTION

A weighing balance having a base body, a weighing chamber rear wall, and a top wall is disclosed. The weighing chamber rear wall has a first side facing the draft shield and a second side located opposing the first side. The weighing balance also has a mounting unit that is movably connected to the first side of the weighing chamber rear wall. The mounting unit is positioned above the top wall. The weighing chamber rear wall is provided with an elongate slot that extends from the first side through the second side. The elongate slot receives the mounting unit and the top wall about the first side and guides them both along the weighing chamber rear wall in a direction normal to the base body. The weighing balance further contains a position control unit located on the second side of the weighing chamber rear wall. The position control unit has a lower carriage operatively connected to the top wall, and an upper carriage operatively connected to the mounting unit. The mounting unit and the top wall are movable together along the elongate slot about the first side of the weighing chamber rear wall. The lower carriage is stoppable by a stopper at a predetermined position away from the base body while at the same time allowing the upper carriage to advance beyond the stopper. Because of the inventive arrangement of the position control unit, the mounting unit is spatially separable from the top wall. The position control unit, more particularly, the stopper is so arranged to ensure distinct stopping positions for the top wall and the mounting unit, as the two elements move away from the base body.

In the preferred embodiment of the weighing balance, the mounting unit is adaptable to receive one or more replaceable accessories such as a dosage-dispensing unit for dosing the test substances in powder or fluid form. The replaceable accessories can as well be a titration unit, a pump unit, a unit with pipe conduits and armatures, a container unit, a sensor unit, a heating and/or cooling unit, display unit, illuminating unit, an ionizing unit or an adapter serving to receive one of the aforementioned accessories or to receive further accessories. The separation of the mounting unit from the top wall is advantageous for easy removal, replacement, cleaning, or servicing of the replaceable accessories receivable on the mounting unit.

In the preferred embodiment, the top wall of the draft shield is provided with an opening that is configured to facilitate the entry of replaceable accessories. The opening is sufficiently large enough to introduce test substance or instruments.

In an advantageous implementation of the weighing balance, the replaceable accessory is a dosing device adapted to enter the weighing chamber through the opening. The dosing device thus entering the weighing chamber through the opening is operated to carry out a fluid or powder dosing operation.

In a preferred embodiment of the weighing balance, the upper carriage of the position control unit is stoppable at a point farthest from the base body by an upper position limiter. The lower carriage together with the upper carriage is stoppable at a point closest to the base body by a lower position limiter. The upper position limiter and the lower position limiter are useful in setting the range or bounds for the movement of the mounting unit along the elongate slot.

Preferably, the stopper and the upper position limiter of the position control unit are sufficiently spaced apart. This arrangement results in stopping the top wall and the mounting unit at different positions away from the base body, which facilitates removal, replacement, cleaning, or servicing of the replaceable accessories received by the mounting unit.

Preferably, the stopper and the upper position limiter are located on the second side of the weighing chamber rear wall. The stopper and the upper position limiter are located on the second side to facilitate interaction with the lower carriage and the upper carriage, respectively.

In the preferred embodiment, the position control unit contains a connecting member in the form of a spring or a telescopic member that connects the lower carriage and the upper carriage. The connecting member creates a compliant connection between the lower carriage and the upper carriage thereby allowing the two components to move in tandem especially when the lower carriage and the upper carriage move away from the base body. The advantageous arrangement allows the connecting member to undergo deformation in order to facilitate spatial separation between the top wall and the mounting unit when the stopper constricts the top wall from further movement away from the base body.

Preferably, the top wall is constituted as a part of a draft shield, which further contains a first side wall, a second side wall, and a front wall. The weighing balance further contains a weighing chamber floor wherein the weighing chamber floor, the weighing chamber rear wall, and the draft shield together enclose a weighing chamber.

In the preferred embodiment of the invention, the elongate slot on the weighing chamber rear wall is formed to be long enough to allow the mounting unit to traverse at least one-third length of the weighing chamber rear wall. The top wall attached to the mounting unit is adapted to be moved along the elongate slot. The volume of the weighing chamber is a function of the size of the draft shield and position of the top wall along the elongate slot. Therefore, having an elongate slot that is at least one-third or longer than one-third of the length of weighing chamber rear wall allows for adjusting the weighing chamber volume to meet the requirements of a desired operation.

In an advantageous embodiment, a longitudinal strip covers the elongate slot to separate the weighing chamber from the second side of the weighing chamber rear wall. The longitudinal strip isolates the weighing chamber from the effects of the components located on the second side as well as abutting the weighing chamber rear wall. In addition, the longitudinal strip also protects the position control unit and other sensitive aggregates of the weighing balance from the corrosive effects of test substances introduced into the weighing chamber.

Preferably, the weighing chamber rear wall contains a base module and a top module. The base module is connected to the weighing chamber floor and the top module is connected to the base module. In a preferred arrangement, the top module is positioned above the base module. Both the base module and the top module are positioned in an upright condition in relation to the weighing chamber floor. In an advantageous embodiment of this invention, the elongate slot is provided on the top module. The modular configuration of the weighing chamber rear wall serves to improve the flexibility of the weighing balance. The modular weighing chamber rear wall allows the use of draft shields of different sizes and volumes on the same weighing balance.

In the preferred embodiment, the position control unit contains a guide rail located on the second side of the weighing chamber rear wall. The guide rail offers the advantage of guiding the lower carriage and the upper carriage in a predetermined linear path along the elongate slot in a direction normal to the base body.

In the preferred embodiment of the inventive weighing balance, the position control unit further contains a motor unit and a drive unit. The drive unit is connected to the upper carriage. The motor unit provides the necessary motive force, which the drive unit receives and in turn transfers to the upper carriage for its movement along the elongate slot.

In the preferred embodiment, the drive unit contains a spindle and a spindle nut. The spindle is rotatable about its own longitudinal axis. The spindle nut is movably connected to the spindle and adaptable to move linearly along the longitudinal axis of the spindle. More particularly, the spindle nut is in a threaded relationship with the spindle. The upper carriage and the spindle nut are fixedly connected. The motive force delivered to the drive unit causes rotational movement of the spindle, which induces linear movement in the spindle nut causing the spindle nut, the upper carriage, and the mounting unit to move in tandem in a direction normal to the base body.

Preferably, at least a portion of the weighing chamber rear wall is configured as a compartment and the position control unit is arranged inside this compartment. The compartment shaped configuration allows enclosure of the position control unit substantially within the weighing chamber rear wall thereby safeguarding the position control unit from external shocks, dust, moisture, and other such corrosive influences.

BRIEF DESCRIPTION OF DRAWINGS

The weighing balance with the weighing chamber rear wall according to the invention will be described hereinafter through embodiments shown schematically in the drawings, wherein.

DESCRIPTION OF EMBODIMENTS

Figure 1:
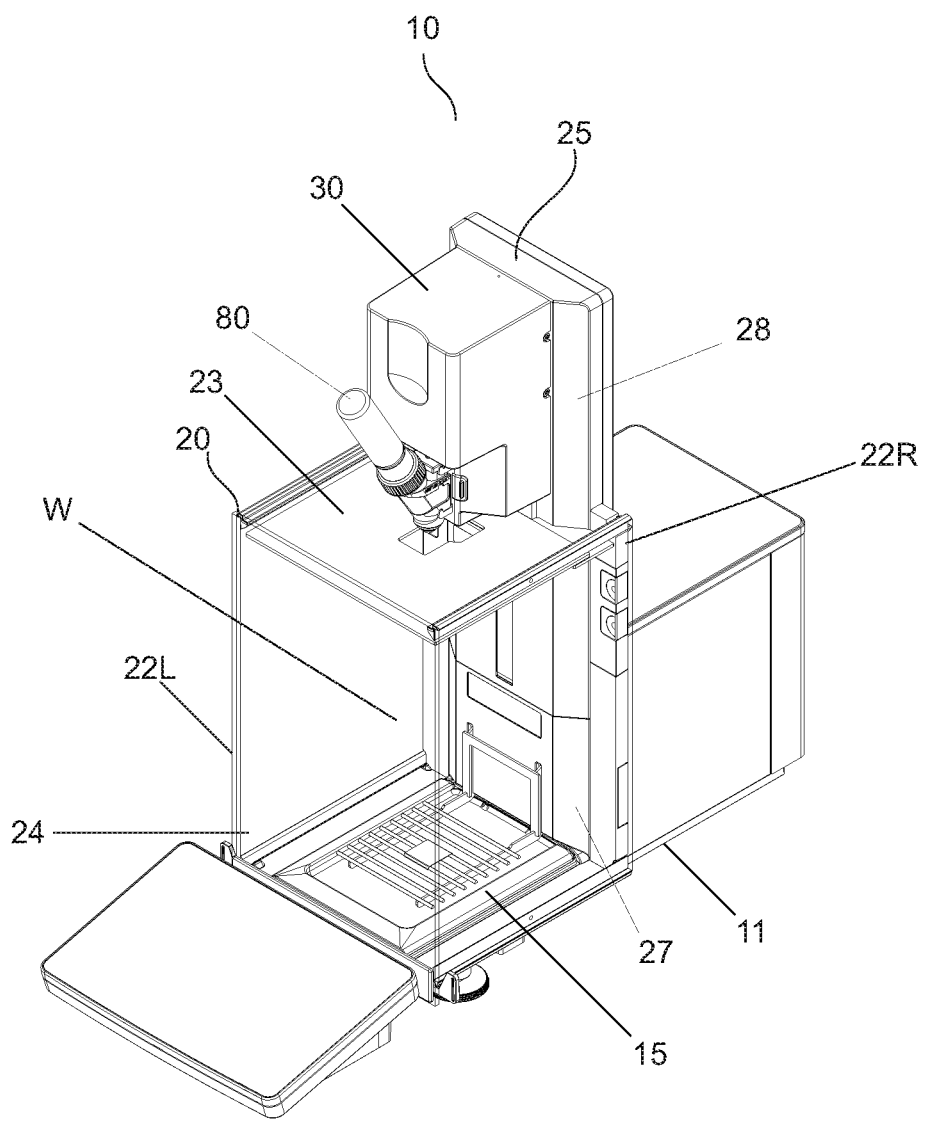
FIG. 1 represents a complete weighing balance of the type to which the invention relates, in a perspective view.

FIG. 1 represents a weighing balance 10 according to the invention in a perspective view. The main parts of the weighing balance 10 are the base body 11, weighing chamber W, weighing chamber rear wall 25, and the mounting unit 30. The weighing chamber W is delimited against the ambient space by transparent wall panels of a draft shield 20, the weighing chamber rear wall 25, and the weighing chamber floor 15. The weighing chamber W is enclosed on the sides, top, and the front, by the corresponding draft shield walls 22L, 22R, 23, and 24 respectively, and on the backside by the weighing chamber rear wall 25, and finally at the bottom by the weighing chamber floor 15. The weighing chamber rear wall 25 is of modular design and contains a base module 27 and a top module 28. The base module 27 is connected to the weighing chamber floor 15 and positioned in upright condition. The top module 28 is positioned above the base module 27 and is connected to the top wall 23 of the draft shield 20. The mounting unit 30 is adaptable to receive one or more replaceable accessories 80 such as a dosage-dispensing unit for dosing the test substances in powder or fluid form. The replaceable accessories 80 can as well be a titration unit, a pump unit, a unit with pipe conduits and armatures, a container unit, a sensor unit, a heating and/or cooling unit, display unit, illuminating unit, an ionizing unit or an adapter serving to receive one of the aforementioned accessories or to receive further accessories.

Figure 2:
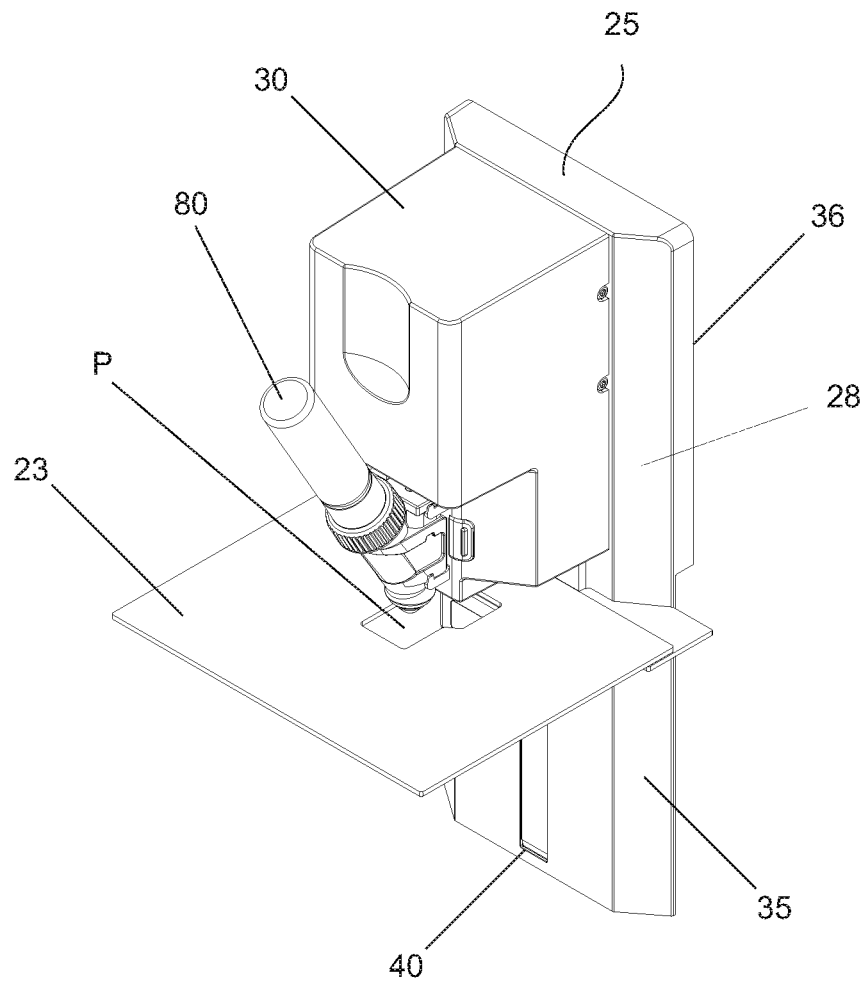
FIG. 2 shows the weighing chamber rear wall along with the mounting unit and the top wall, in a perspective view.

FIG. 2 represents a portion of the weighing balance 10 showing weighing chamber rear wall 25 along with the mounting unit 30 and the top wall 23. The weighing chamber rear wall 25 contains a first side 35 and a second side 36, wherein the first side 35 is positioned facing the draft shield 20. The second side 36 is located opposing the first side 35. The weighing chamber rear wall 25 further contains an elongate slot 40 extending from the first side 35 through the second side 36. The mounting unit 30 is received on the first side 35 of the weighing chamber rear wall 25 and is adapted to be guided along the elongate slot 40 in a direction normal to the direction of the base body. It may be noted that the elongate slot 40 is provided on the top module 28 of the weighing chamber rear wall 25. The top wall 23 of the draft shield 20 is provided with an opening P for facilitating the entry of replaceable accessories 80 into the weighing chamber W. The top wall 23 is positioned below the mounting unit 30 and the two components remain connected by means of a special arrangement, which will be explained in detail in the ensuing description.

Figure 3:
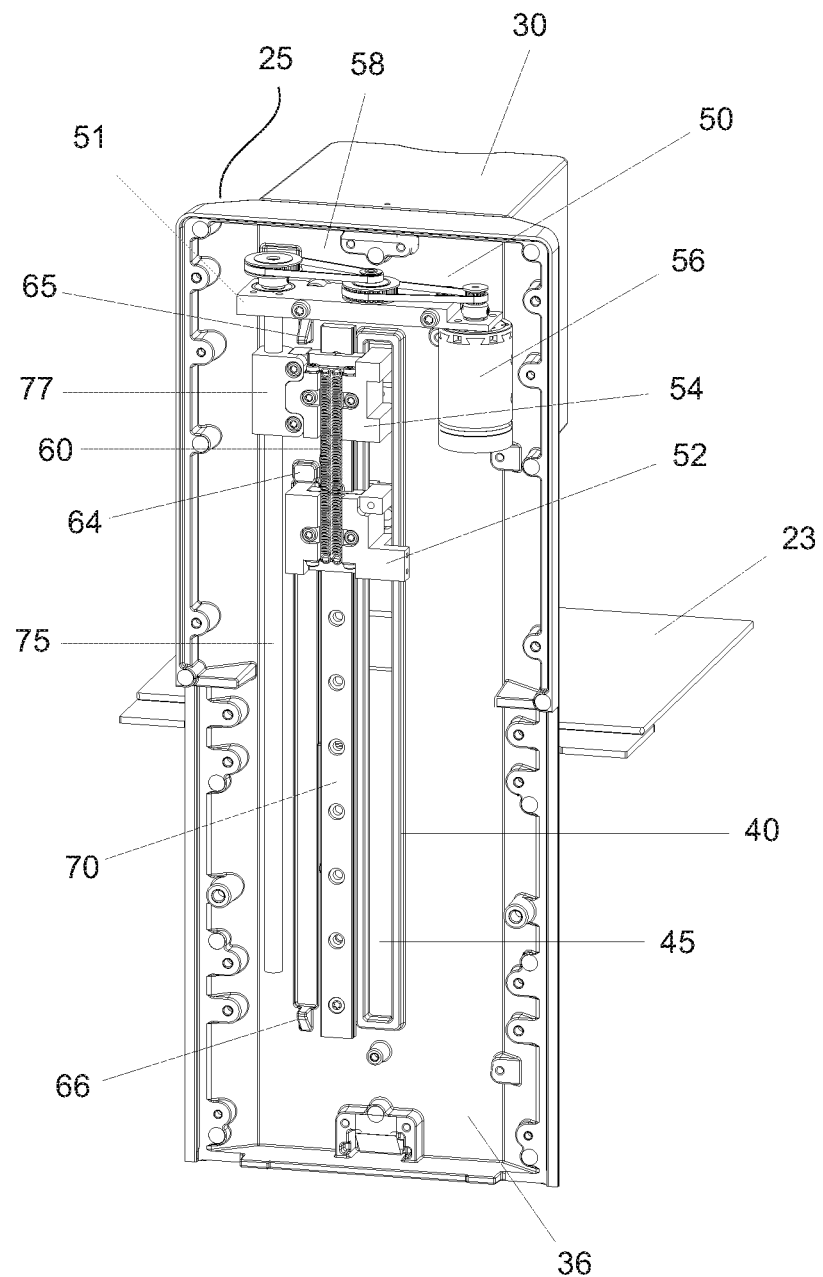
FIG. 3 shows the arrangement of position control unit on the second side of the weighing chamber rear wall.
Figure 4:
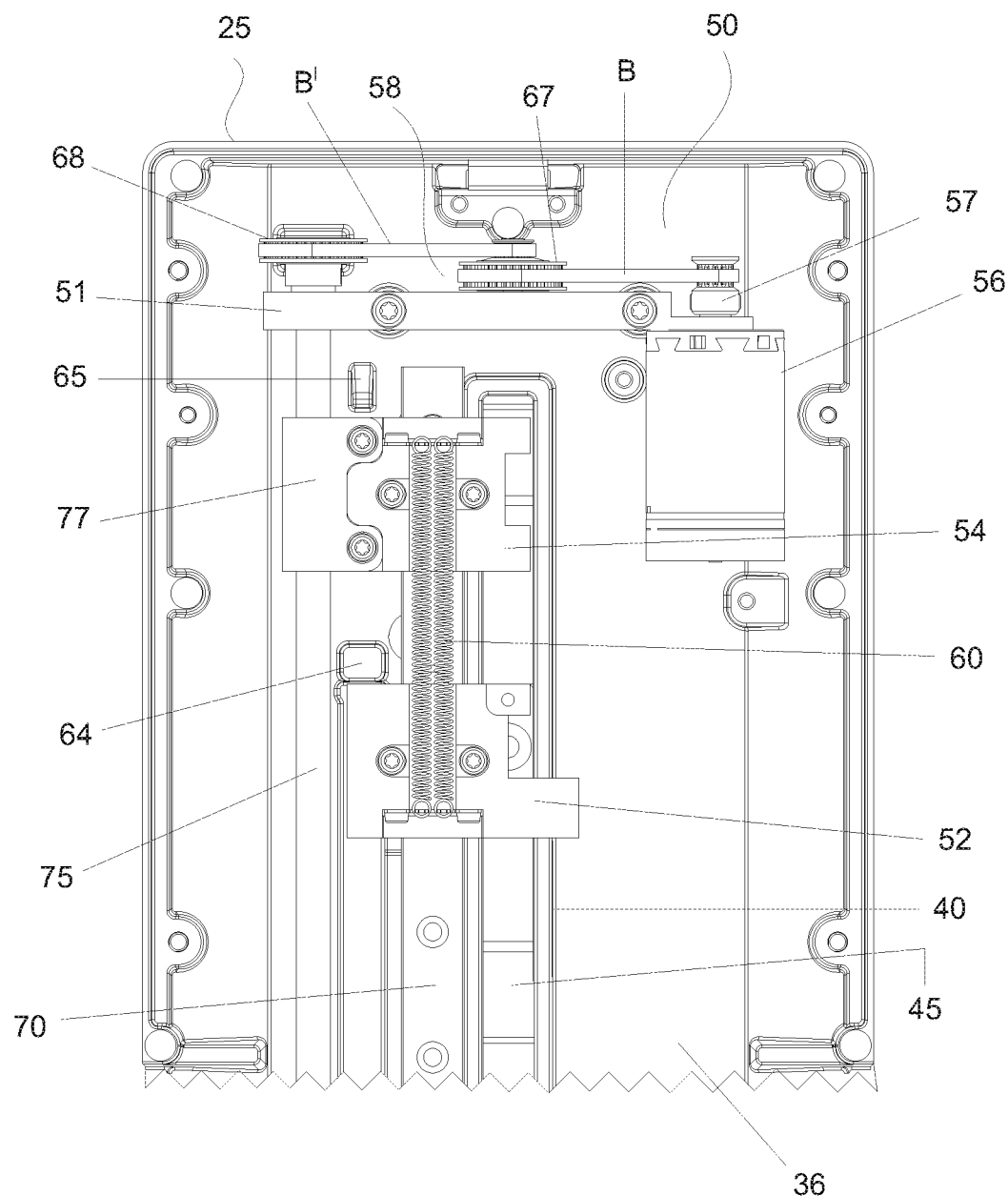
FIG. 4 represents a further enlarged fractional view of the elements shown in FIG. 3.

FIGS. 3 and 4 show the inventive arrangement of position control unit 50 on the second side 36 of the weighing chamber rear wall 25. The position control unit 50 is an assembly of several aggregates arranged on the second side 36 and is fully enclosed within the compartment shaped configuration of the weighing chamber rear wall 25. The position control unit 50 contains a mounting bracket 51, a lower carriage 52 extending through the elongate slot 40 and operatively connected to the top wall 23 on the first side 35. Similarly, there is also provided an upper carriage 54 extending through the elongate slot 40 and operatively connected to the mounting unit 30. The upper carriage 54 connected to the mounting unit 30 is positioned above the lower carriage 52, which is connected to the top wall 23 of the draft shield 20. A connecting member 60 compliantly connects the lower carriage 52 and the upper carriage 54 thereby allowing the top wall 23 and the mounting unit 30 to move simultaneously along the elongate slot 40. In the advantageous embodiment, the connecting member 60 contains a pair of springs arranged parallel to each other that can undergo deformation. The position control unit 50 further contains a guide rail 70 for guiding the lower carriage 52 and the upper carriage 54 along the elongate slot 40 in the direction normal to the base body 11. The position control unit 50 further contains a motor unit 56 having a drive shaft 57, which are both mounted on the mounting bracket 51. The mounting bracket 51 also receives a drive unit 58 that transfers power from the motor unit 56 to the upper carriage 54 for moving the mounting unit 30 along the elongate slot 40 of the weighing chamber rear wall 25. The position control unit 50 further contains a stopper 64 configured to interact and stop the lower carriage 52 at a predetermined position on the weighing chamber rear wall 25. The position control unit 50 contains an upper position limiter 65 aimed at setting a positional limit to the upper carriage 54 during its upward movement. Similarly, the positional control unit 50 contains a lower position limiter 66 that sets a positional limit to the lower carriage 52 and thereby to the upper carriage 54 during their downward movement along the elongate slot 40 towards the base body 11. The drive unit 58 contains an intermediate pulley 67, an endless belt B connecting the drive shaft 57 and the intermediate pulley 67, a driven pulley 68, another endless belt BI connecting the intermediate pulley 67 and the driven pulley 68, a spindle 75 connected to the driven pulley 68, and a spindle nut 77 whose one end is in threaded relationship with the spindle 75 and the other end is fixedly connected to the upper carriage 54. When the motor unit 56 is operated, the drive shaft 57 transfers power to the intermediate pulley 67 through the endless belt B. The intermediate pulley 67 in turn transfers rotary motion to the driven pulley 68 to which the spindle 75 is attached. The spindle 75 is arranged to rotate about its own longitudinal axis. The rotational movement of the spindle 75 induces linear movement in the spindle nut 77 thereby causing movement of the upper carriage 54 and the accompanying mounting unit 30 in a direction normal to the base body 11. The moving upper carriage 54 also causes movement of the lower carriage 52 and the accompanying top wall 23 due to the compliant connection established between the two by the connecting member 60. In the advantageous embodiment, a longitudinal strip 45 separating the weighing chamber W from the second side 36 of the weighing chamber rear wall 25 covers the elongate slot 40. The longitudinal strip 45 is tautly secured to the two longitudinal ends of the weighing chamber rear wall 25. In the preferred embodiment, the longitudinal strip 45 is made of metal or polymer material having non-corrosive properties. According to the foregoing description, it is manifest that the position control unit 50 plays a pivotal role in the movement and stoppage of the mounting unit 30 and the top wall 23 duo along the elongate slot 40.

Figure 5A:
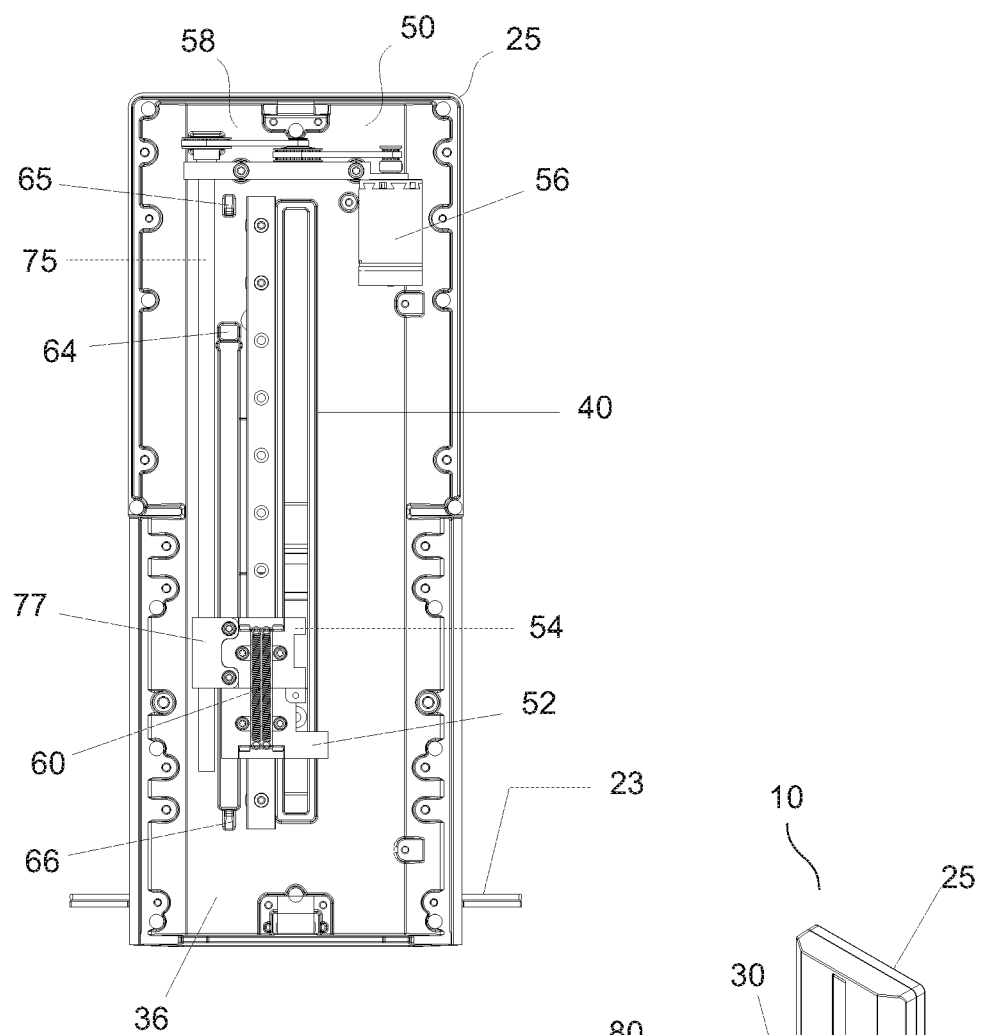
FIG. 5A shows the weighing chamber rear wall with the lower carriage and the upper carriage positioned closer to the lower position limiter.

FIG. 5A shows the second side 36 of the weighing chamber rear wall 25 having the position control unit 50 in a specific operative condition. By way of operating the motor unit 56, power is transferred through the drive unit 58 for raising or lowering the upper carriage 54. The upper carriage 54 and the lower carriage 52 move along the elongate slot 40 in tandem due to the connecting member 60. In this particular figure, both the lower carriage 52 and the upper carriage 54 are shown to remain spatially closer to the lower position limiter 66.

Figure 5B:
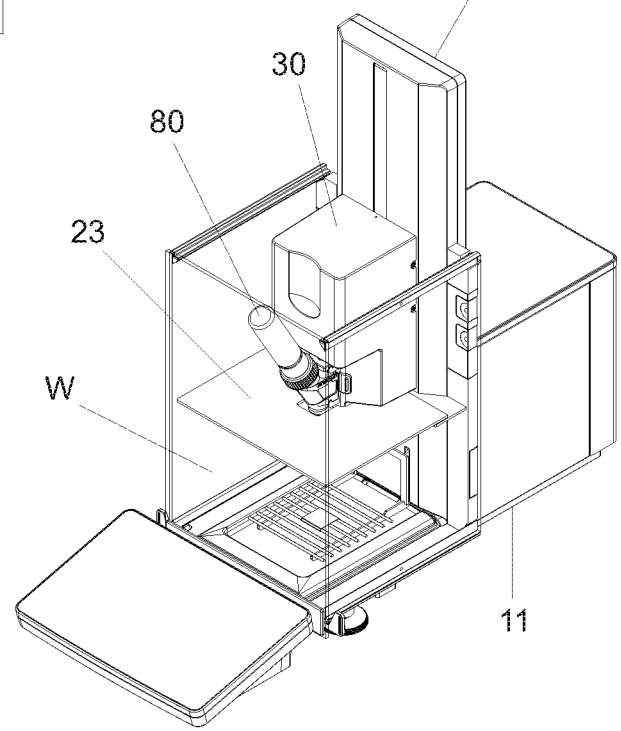
FIG. 5B shows the weighing balance having the mounting unit along with the top wall with the replaceable accessory lowered into the weighing chamber for operation.

FIG. 5B shows the corresponding positions of the mounting unit 30 and the top wall 23 in relation to the positions of upper carriage 54 and the lower carriage 52 shown in FIG. 5A. The mounting unit 30 along with the top wall 23 is lowered closer to the base body 11. The mounting accessory 80 is sufficiently lowered into the weighing chamber W for performing the desired operation, which in the exemplary case is a dosage dispensing operation. It is clear from the foregoing description that the volume of the weighing chamber W is adjustable to meet the requirements of the desired operation by way of lowering or raising the position of the top wall 23 along the elongate slot 40 of the weighing chamber rear wall 25.

Figure 6A:
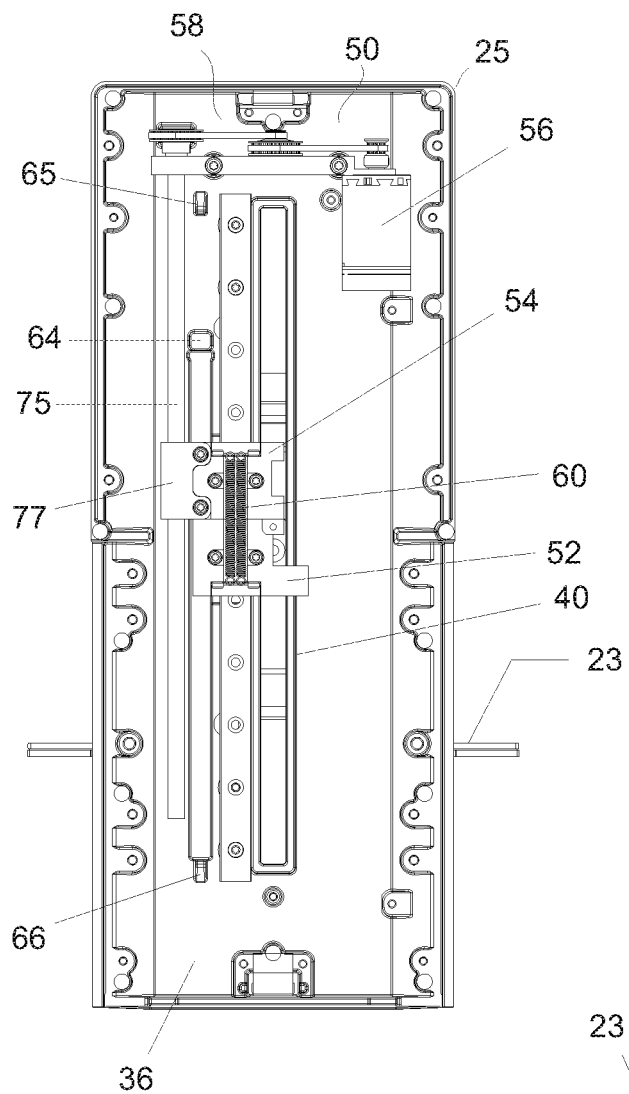
FIG. 6A shows the weighing chamber rear wall with the lower carriage and the upper carriage positioned equidistant to the lower position limiter and the upper position limiter.
Figure 6B:
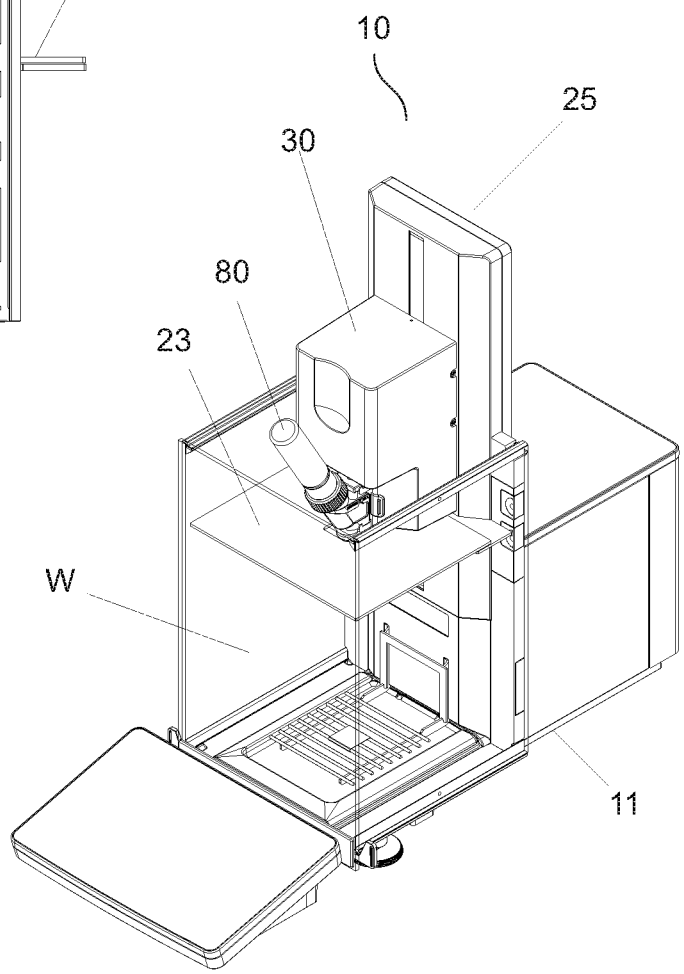
FIG. 6B shows the weighing balance having the mounting unit along with the top wall moving away from the base body with the replaceable accessory lowered into the weighing chamber.

In FIG. 6A, the lower carriage 52 and the upper carriage 54 are positioned nearly equidistant from the upper position limiter 65 and the lower position limiter 66. However, the lower carriage 52 and the upper carriage 54 continue to move in tandem along the elongate slot 40 when power is transferred from the motor unit 56 through the drive unit 58. FIG. 6B shows the mounting unit 30 along with the top wall 23 moving away from the base body 11. As the top wall 23 moves upwards, the volume of the weighing chamber W increases compared to its volume when the top wall 23 is at a position shown in FIG. 5B.

Figure 7A:
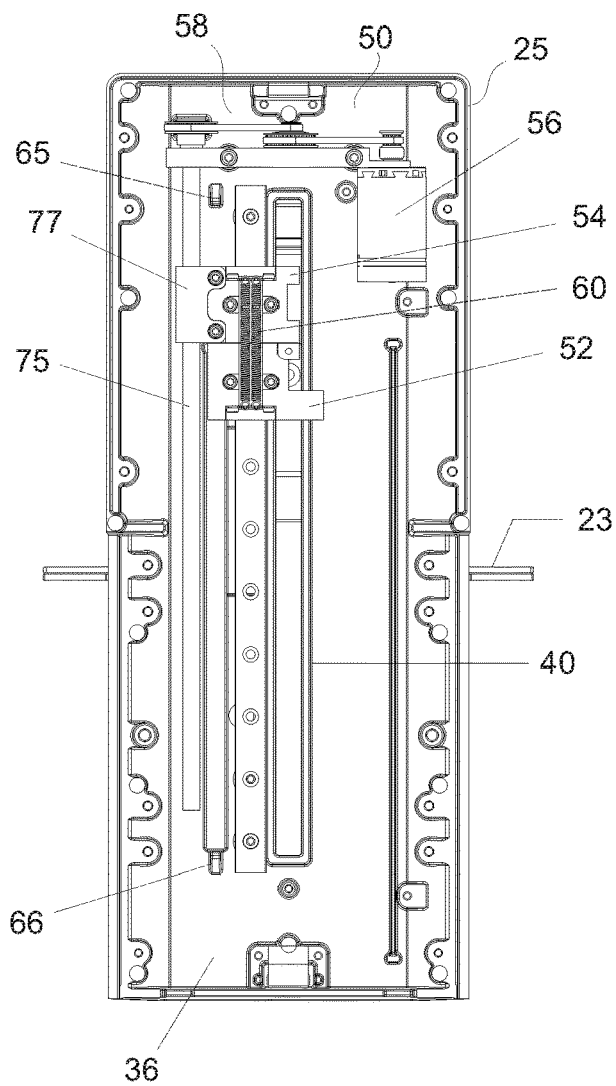
FIG. 7A shows the weighing chamber rear wall with the lower carriage stopped at a predetermined position by the stopper and the upper carriage still some distance away from reaching the upper position limiter.
Figure 7B:
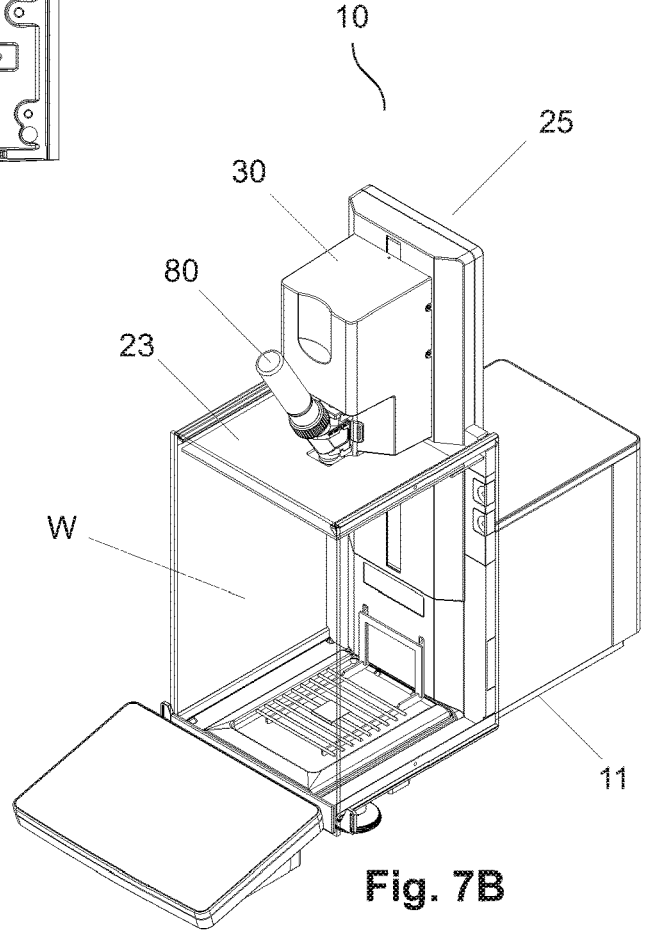
FIG. 7B shows the weighing balance having the mounting unit and the top wall stopped at a predetermined distance away from the base body with the replaceable accessory lowered into the weighing chamber, while the mounting unit is still capable of moving some more distance away from the base body.

FIG. 7A shows the lower carriage 52 and the upper carriage 54 positioned near the stopper 64. More specifically, the stopper 64 (hidden below the spindle nut 77 and upper carriage 54 in FIG. 7A) configured as a projection interacts and stops the lower carriage 52 at a distinct and predetermined position away from the base body 11. It must be noted that the upper carriage 54 remains unconstrained to advance further along its path upon receiving the necessary drive from the motor unit 56. Consequently, as shown in FIG. 7B, the top wall 23 of the draft shield 20 has reached the farthest distance away from the base body 11 with no possibility to advance in the upward direction any further. At this position of the top wall 23, the volume of the weighing chamber W is the maximum for the given size of the draft shield 20. However, it is imperative to note that the replaceable accessory 80 continues to remain lowered into the weighing chamber W.

Figure 8A:
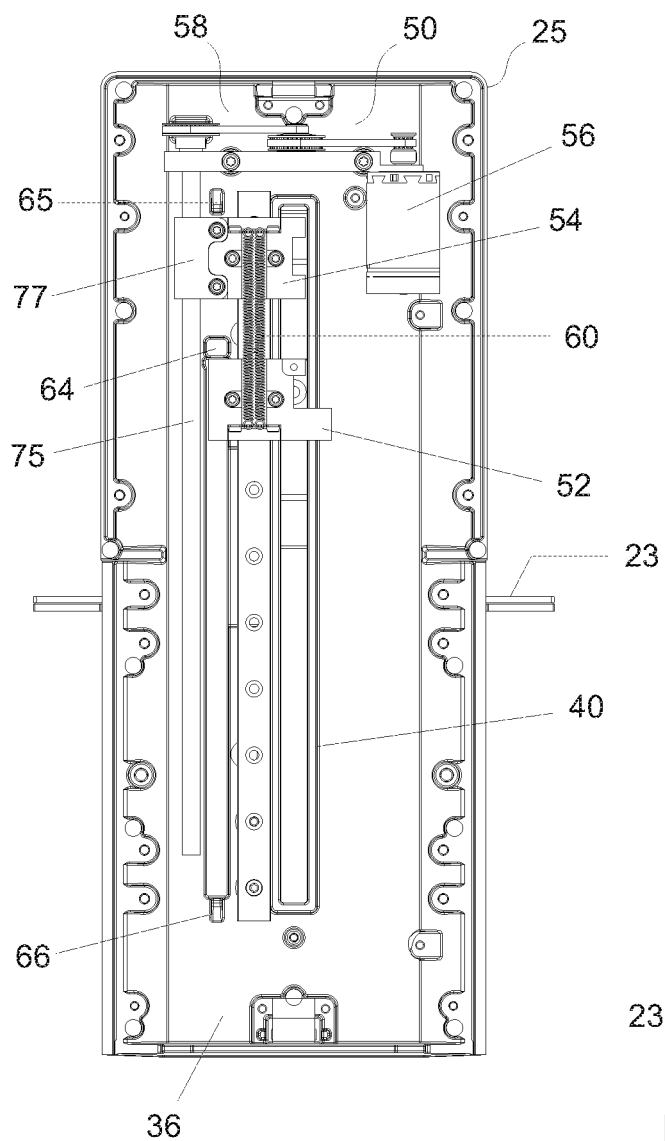
FIG. 8A shows the weighing chamber rear wall with the lower carriage spatially separated from the upper carriage yet compliantly connected together by the connecting member.

FIG. 8A shows further advancement of the upper carriage 54 along the elongate slot 40 while at the same time the lower carriage 52 remains constricted by the stopper 64 at a predetermined and distinct position. The tandem movement, which hitherto defined the relationship between the lower carriage 52 and the upper carriage 54 no longer exists. However, the lower carriage 52 and the upper carriage 54 continue to remain connected to one another although in a compliant manner due to the deformation of the connecting member 60. The upper position limiter 65 finally constricts further movement of the upper carriage 54. In the advantageous embodiment, the spindle nut 77 whose one end is fixedly connected to the upper carriage 54 interacts with the upper position limiter 65.

Figure 8B:
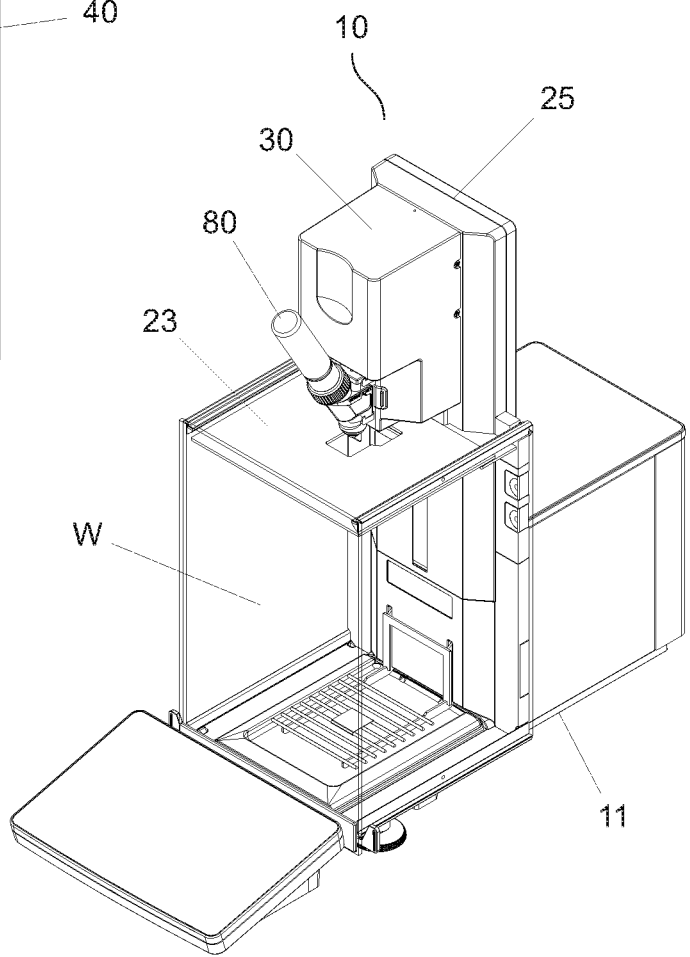
FIG. 8B shows the weighing balance having the mounting unit sufficiently spaced apart from the top wall with the replaceable accessory removed from the weighing chamber for facilitating removal, replacement, cleaning, or servicing.

FIG. 8B shows the mounting unit 30 spatially separated from the top wall 23. As the mounting unit 30 advances further away from the base body 11, the replaceable accessory 80 attached to the mounting unit 30 is successfully removed from the weighing chamber W for facilitating removal, replacement, cleaning, or servicing. The stopper 64 of the position control unit 50 directly aids in stopping the top wall 23 at a predetermined and distinct position away from the base body 11. The connecting member 60 by way of deformation aids in moving the mounting unit 30 spatially further away from the top wall 23, while still keeping the connection between the two components intact.

Although the invention has been described through the presentation of one specific embodiment of the inventive concept of moving the mounting unit and the top wall by means of a position control unit, it is considered self-evident that numerous additional variants are encompassed by the teachings of the present invention, including for example the use of magnetized lower carriage and upper carriage or a mechanical coupling instead of a connecting member for creating a compliant connection between the two or the use of a sensing device as a replaceable accessory. Such combinations and variations of the inventive arrangement of the position control unit are considered without exception to fall well within the scope of protection that is hereby sought for the present invention.

What is claimed is:

1. A weighing balance, comprising:
a base body;
a weighing chamber, atop the base body and enclosed by a draft shield, having a rear wall and a top wall, the rear wall having a first side that faces the draft shield and a second side opposite the first side, the rear wall also having an elongate slot that extends from the first side through the second side;
a mounting unit, movably connected to the first side and positioned above the top wall, with the elongate slot receiving the mounting unit and the top wall about the first side, such that the elongate slot guides the mounting unit and the top wall in a direction normal to the base body;
a position control unit, located on the second side of the rear wall, comprising a lower carriage operatively connected to the top wall and an upper carriage operatively connected to the mounting unit, such that the mounting unit and the top wall are movable together along the elongate slot; and
a stopper, arranged to stop the lower carriage at a predetermined position away from the base body while allowing the upper carriage to advance therebeyond, thereby separating the mounting unit spatially from the top wall.

2. The weighing balance of claim 1, wherein:
the mounting unit is configured to receive one or more replaceable accessories selected from the group consisting of: a dosage-dispensing unit for dosing test substances in powder or fluid form, a titration unit, a pump unit, a unit with pipe conduits and armatures, a container unit, a sensor unit, a heating and/or cooling unit, a display unit, an illuminating unit, an ionizing unit, and an adapter serving to receive one of the aforementioned units or to receive further units.

3. The weighing balance of claim 2, further comprising:
an opening in the top wall, configured to facilitate the entry of the replaceable accessories.

4. The weighing balance of claim 3, wherein:
the replaceable accessory is a dosing device adapted to enter the weighing chamber through the opening for carrying out a fluid or powder dosing operation.

5. The weighing balance of claim 2, wherein:
an upper position limiter stops the upper carriage at a point farthest from the base body; and
a lower position limiter stops the lower carriage and the upper carriage together at a point closest to the base body.

6. The weighing balance of claim 5, wherein:
the stopper and the upper position limiter are spaced sufficiently spaced apart to facilitate removal, replacement, cleaning, or servicing of the replaceable accessories received by the mounting unit.

7. The weighing balance of claim 5, wherein:
the stopper and the upper position limiter are located on the second side of the weighing chamber rear wall.

8. The weighing balance of claim 1, wherein:
the position control unit further comprises a connecting member in the form of a spring or a telescopic member or a mechanical coupling that connects the lower carriage and the upper carriage.

9. The weighing balance of claim 1, wherein:
the top wall is constituted as a part of the draft shield, which further comprises a first side wall, a second side wall, and a front wall; and
the weighing balance further comprises a weighing chamber floor, such that the weighing chamber floor, the weighing chamber rear wall, and the draft shield together enclose the weighing chamber.

10. The weighing balance of claim 1, wherein:
the elongate slot is sufficiently long to allow the mounting unit to traverse at least one-third of a length of the weighing chamber rear wall; and
the elongate slot is covered by a longitudinal strip that separates the weighing chamber from the second side of the weighing chamber rear wall.

11. The weighing balance of claim 1, wherein:
the weighing chamber rear wall comprises a base module and a top module, the base module being connected to the weighing chamber floor, and the top module being connected to the top wall.

12. The weighing balance of claim 1, wherein:
the position control unit further comprises a guide rail for guiding the lower carriage and the upper carriage along the elongate slot in the direction normal to the base body.

13. The weighing balance of claim 1, wherein:
the position control unit further comprises a motor unit and a drive unit, with the drive unit connected to the upper carriage.

14. The weighing balance of claim 13, wherein the drive unit further comprises:
a spindle, rotatable about a longitudinal axis thereof; and
a spindle nut, movably connected to the spindle and adapted to move linearly along the longitudinal axis of the spindle, the spindle nut being connected to the spindle nut, such that rotational movement of the spindle induces linear movement in the spindle nut, thereby causing simultaneous movement of the upper carriage and the mounting unit in a direction normal to the base body.

15. The weighing balance of claim 1, wherein:
at least a portion of the weighing chamber rear wall is configured as a compartment, and the position control unit is arranged in the compartment-shaped portion of the weighing chamber rear wall, such that the position control unit is substantially enclosed within the weighing chamber rear wall.

* * * * *